US009827829B2

(12) United States Patent
Errick et al.

(10) Patent No.: US 9,827,829 B2
(45) Date of Patent: Nov. 28, 2017

(54) DEPLOYABLE VENT FOR AUTOMOTIVE VENTILATION SYSTEM

(71) Applicant: FORD GLOBAL TECHNOLOGIES, LLC, Dearborn, MI (US)

(72) Inventors: Steven D. Errick, Bloomfield Hills, MI (US); Paul B. Hoke, Plymouth, MI (US)

(73) Assignee: FORD GLOBAL TECHNOLOGIES, Dearborn, MI (US)

( * ) Notice: Subject to any disclaimer, the term of this patent is extended or adjusted under 35 U.S.C. 154(b) by 668 days.

(21) Appl. No.: 14/179,685

(22) Filed: Feb. 13, 2014

(65) Prior Publication Data
US 2015/0224853 A1  Aug. 13, 2015

(51) Int. Cl.
*B60H 1/24* (2006.01)
*B60H 1/00* (2006.01)
*B60H 1/26* (2006.01)
*B60H 1/34* (2006.01)

(52) U.S. Cl.
CPC ............. *B60H 1/26* (2013.01); *B60H 1/3407* (2013.01); *B60H 2001/3464* (2013.01)

(58) Field of Classification Search
CPC .. B60H 1/24; B60H 1/34; B60H 1/242; B60S 1/54
USPC ................. 454/121, 127, 145, 152
See application file for complete search history.

(56) References Cited

U.S. PATENT DOCUMENTS

| 1,778,278 | A | * | 10/1930 | Schanbacher | B60S 1/54 237/12.3 R |
| 1,870,726 | A | * | 8/1932 | Greene | B60S 1/54 454/123 |
| 2,909,113 | A | * | 10/1959 | Hatcher | E04D 13/1471 138/120 |
| 3,587,976 | A | * | 6/1971 | Jacuzzi | A61H 33/027 239/428.5 |
| 3,839,950 | A | * | 10/1974 | Kelly | B60H 1/3435 454/145 |
| 4,598,631 | A | * | 7/1986 | Everett | F41J 11/00 273/348 |
| 6,089,971 | A | * | 7/2000 | Jokela | B60H 1/242 454/127 |
| 6,257,975 | B1 | * | 7/2001 | Giez | B60H 1/00064 454/127 |

(Continued)

Primary Examiner — Steven B McAllister
Assistant Examiner — Ko-Wei Lin
(74) Attorney, Agent, or Firm — Vichit Chea; MacMillan, Sobanski & Todd, LLC

(57) ABSTRACT

A ventilation system is provided for a transportation vehicle having a passenger cabin with an interior trim surface. A stationary duct segment receives an inlet air flow and has a stationary outlet hidden behind the interior trim surface. A telescoping duct segment has a sliding inlet sealingly coupled to the stationary outlet so that it slides on the stationary outlet between a retracted position and an extended position. The telescoping duct segment has a movable outlet arranged to provide a variable flow cross section to the passenger cabin that increases as the telescoping duct segment slides from the retracted position to the extended position. A trim hood provides a portion of the interior trim surface and is movable with the telescoping duct segment. The trim hood has a pivot axis at an end of the trim hood remote from the movable outlet.

14 Claims, 4 Drawing Sheets

(56) References Cited

U.S. PATENT DOCUMENTS

| | | | |
|---|---|---|---|
| 6,394,890 B1 * | 5/2002 | Merkel | B60H 1/242 454/121 |
| 6,394,891 B1 | 5/2002 | Arold | |
| 6,438,789 B1 * | 8/2002 | Murawa | B60S 1/38 15/250.01 |
| 6,554,696 B2 | 4/2003 | Kowalski et al. | |
| 6,739,969 B2 | 5/2004 | Shin | |
| 6,857,955 B1 * | 2/2005 | Held | B60H 1/246 454/143 |
| 7,555,807 B1 * | 7/2009 | Mastandrea | B60S 1/544 15/250.01 |
| 2006/0030256 A1 * | 2/2006 | Kamano | B60H 1/3407 454/127 |
| 2012/0015595 A1 * | 1/2012 | Sabadie | B64C 1/406 454/76 |
| 2014/0227958 A1 | 8/2014 | Baker | |

* cited by examiner

DEPLOYABLE VENT FOR AUTOMOTIVE VENTILATION SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to ventilation systems for automotive vehicles, and, more specifically, to a deployable vent with improved appearance and ergonomics.

Heating, ventilating, and air conditioning (HVAC) systems use ducts to convey air which is driven by a blower past heat exchangers (e.g., an evaporator or heater core) and then to various outlets within a passenger cabin including outlet vents or registers serving corresponding zones in the cabin. Common vent locations include positions on an instrument panel or dashboard (such as at the center stack or at driver and passenger sides) for front seat passengers and console or ceiling locations for vents serving the rear seating rows.

Except for floor vents, typical registers include a movable nozzle and/or vanes to manually control the airflow direction and volume. Automatically-controlled blend doors within a main HVAC unit (such as an air-handling case) may also determine the volume and temperature of air delivered to particular ducts, including a complete shut-off of air to particular registers in certain circulation modes.

Since vents must be placed on the interior trim surfaces close to the passengers, they interrupt the aesthetic appearance and styling of the trim surfaces (e.g., the instrument panel). Depending on ambient air conditions and/or an air circulation mode being chosen by the user, particular registers may frequently be cut off from any active airflow.

Various movable doors have been proposed in the art for concealing unused registers. However, movable doors consume excessive panel space and/or require intricate and expensive components. Furthermore, covering vents with movable doors has achieved only partial success in hiding a vent when it is not being used because the surface area occupied by the vent on the visible trim surface with the door closed is just as large as when the door is open.

SUMMARY OF THE INVENTION

In one aspect of the invention, a ventilation system is provided for a transportation vehicle having a passenger cabin with an interior trim surface. A stationary duct segment receives an inlet air flow and has a stationary outlet hidden behind the interior trim surface. A telescoping duct segment has a sliding inlet sealingly coupled to the stationary outlet so that it slides on the stationary outlet between a retracted position and an extended position. The telescoping duct segment has a movable outlet arranged to provide a variable flow cross section to the passenger cabin that increases as the telescoping duct segment slides from the retracted position to the extended position. A trim hood provides a portion of the interior trim surface and is movable with the telescoping duct segment. The trim hood has a pivot axis at an end of the trim hood remote from the movable outlet.

DETAILED DESCRIPTION OF PREFERRED EMBODIMENTS

Figure 1:
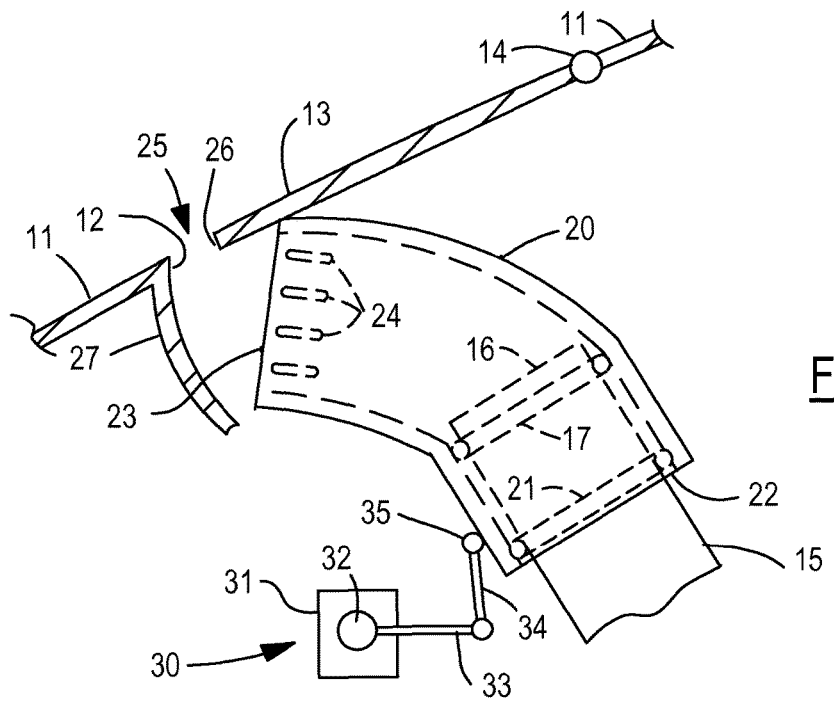
FIG. 1 is a cross section of a first embodiment of a power-actuated telescoping duct system in a fully retracted position.
Figure 2:
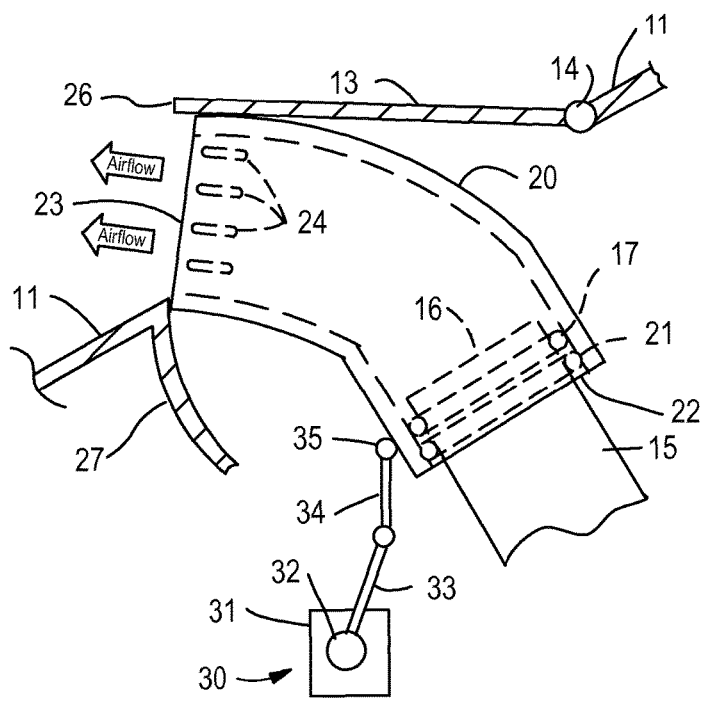
FIG. 2 is a cross section of the duct system of FIG. 1 in a fully extended position.

Referring now to FIGS. 1 and 2, a first embodiment of a ventilation system of the present invention is shown in which a passenger cabin 10 has an interior trim surface 11 (e.g., the surface of an instrument panel in front of the driver and/or front seat passengers). Trim surface 11 has an aperture 12 through which a vent can be selectably deployed. A trim hood 13 is arranged within the aperture 12 and has a pivot axis 14 in the form of a hinge that allows trim hood 13 to rotate between open and closed positions. Trim hood 13 preferably has a finish (e.g., color and texture) that matches trim surface 11. Furthermore, trim hood 13 is preferably configured to lie flush with trim surface 11 when in the closed position.

A stationary duct 15 receives an inlet airflow from the main HVAC system (not shown). Stationary duct 15 is rigidly mounted and has a stationary outlet 16 which is hidden behind trim surface 11 and trim hood 13. A stationary seal 17 may preferably be arranged around an outer periphery of stationary outlet 16. A telescoping duct segment 20 is fitted over stationary duct 15 in a slidable manner. Alternatively, a telescoping duct could be mounted for sliding inside a stationary duct. A seal 21 may preferably be affixed to telescoping duct 20 at an inlet end 22 and is slidable therewith. Seals 17 and 21 may be comprised of 0-rings of approximately the same size, thereby resulting in a smooth, linear telescoping motion of duct 20 along duct 15 between a fully retracted position (FIG. 1) and a fully extended position (FIG. 2).

Telescoping duct 20 has a movable outlet 23 which is arranged to provide a variable flow cross section into passenger cabin 10. The flow cross section increases as telescoping duct 20 slides from the retracted position of FIG. 1 to the fully extended position of FIG. 2. The variable flow cross section results from the portion of outlet 23 that protrudes above trim surface 11. A plurality of vanes 24 may optionally be provided in outlet 23 to modify the direction of an airflow emerging from outlet 23.

Trim hood 13 may substantially fill aperture 12 for maximum concealment of the deployable vent (typically resulting in a complete cutoff of the flow cross section). As shown in FIG. 1, a gap or slot 25 may be arranged along at least a remote edge 26 of trim hood 13 that is present even when trim hood 13 is in the fully closed position so that at least a predetermined minimum flow cross section is always available. In connection with slot 25, a guide wall 27 may be arranged on trim surface 11 at the edge of aperture 12 in order to guide an air flow from outlet 23 into slot 25.

The embodiment in FIGS. 1 and 2 includes a power actuator 30 coupled to an electronic controller 36 for placing telescoping duct 20 at a commanded position. An electric motor 31 has an output rotor 32 coupled to an anchor point 35 on duct 20 via link arms 33 and 34. Rotor 32 can be commanded to rotate to a position corresponding to the retracted position of FIG. 1, the fully extended position of FIG. 2, or to a partially extended position therebetween. Controller 36 may respond to manual user commands via a human-machine interface (HMI, not shown) for specifying the vent position or to commands generated by the HVAC system. For example, the HVAC system may command a vent opening that is proportional to the speed of the blower motor.

Trim hood 13 and telescoping duct 20 are preferably fixed together (i.e., linked) using an appropriate interface, such as a sliding pin arrangement (not shown). It is desirable that they always move together. Thus, when telescoping duct 20 is automatically moved by an actuator, then trim hood 13 automatically moves in the same direction. Alternatively, if no power actuator is present, then manual movement of trim hood 13 by a user can correspondingly result in movement of telescoping duct 20. In an arrangement in which trim hood 13 pivots and telescoping duct 20 slides linearly, then a sliding interface may be used to link them together.

FIGS. 3-8 illustrate a second embodiment wherein the trim hood and telescoping duct may be a one-piece, integrated construction. This embodiment can result in more compact operation by virtue of a curved sliding interface rather than the straight sliding interface of FIGS. 1 and 2.

A stationary duct 40 is slidably coupled to a telescoping duct 41. A trim hood 42 is fixed on telescoping duct 41 (e.g., resulting from being formed in one piece by injection molding). Trim hood 42 has a pivot (e.g., hinge) mounting 43 along one edge.

Stationary duct 40 has an inlet 44 and an outlet 45. Telescoping duct 41 has a sliding inlet 46 and a movable outlet 47. Telescoping duct 41 includes an interior wall 48 within trim hood 42 for guiding an airflow to outlet 47 which provides a variable flow cross section as telescoping duct 41 slides (i.e., pivots) over seal elements 50 and 51.

Stationary duct 40 has a curved portion 37 at its stationary outlet end and telescoping duct 41 has a conforming curved portion 38 at its sliding inlet end. Curved portions 37 and 38 substantially follow a radius centered on the pivot axis defined by pivot mounting 43, so that telescoping duct 41 slides smoothly over stationary duct 40 as it rotates around the pivot axis.

Figure 3:
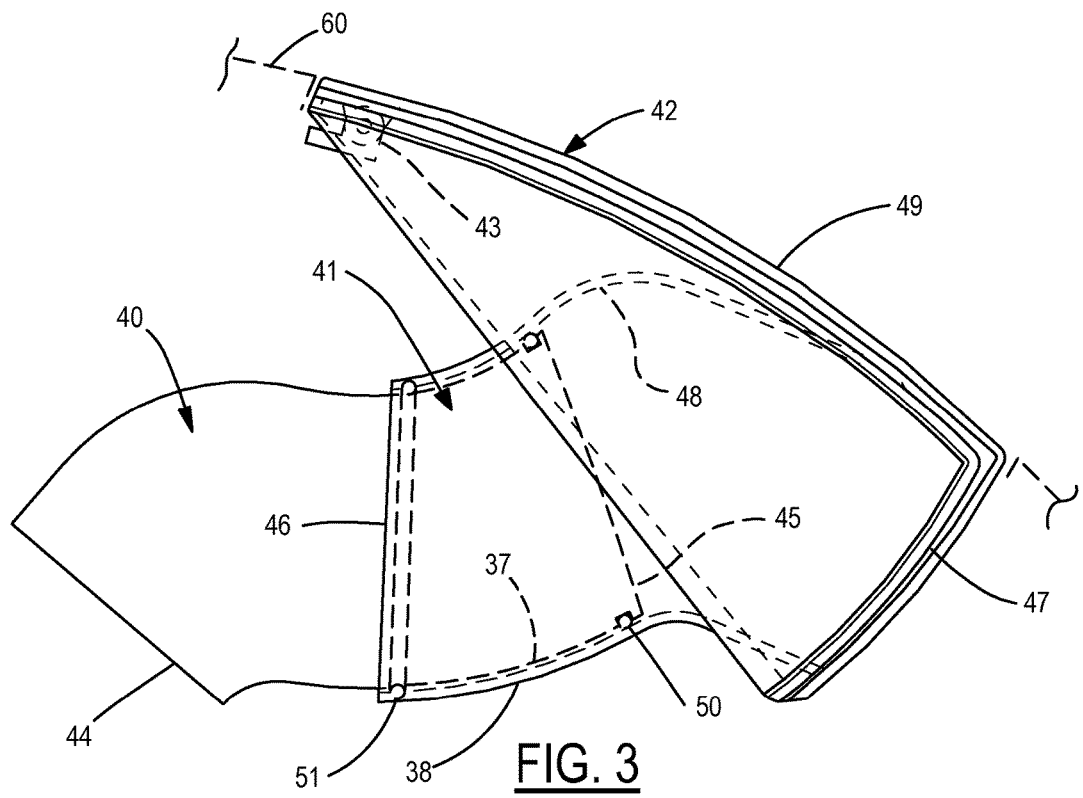
FIG. 3 is a side view of a second embodiment of a telescoping duct system in a retracted position.
Figure 4:
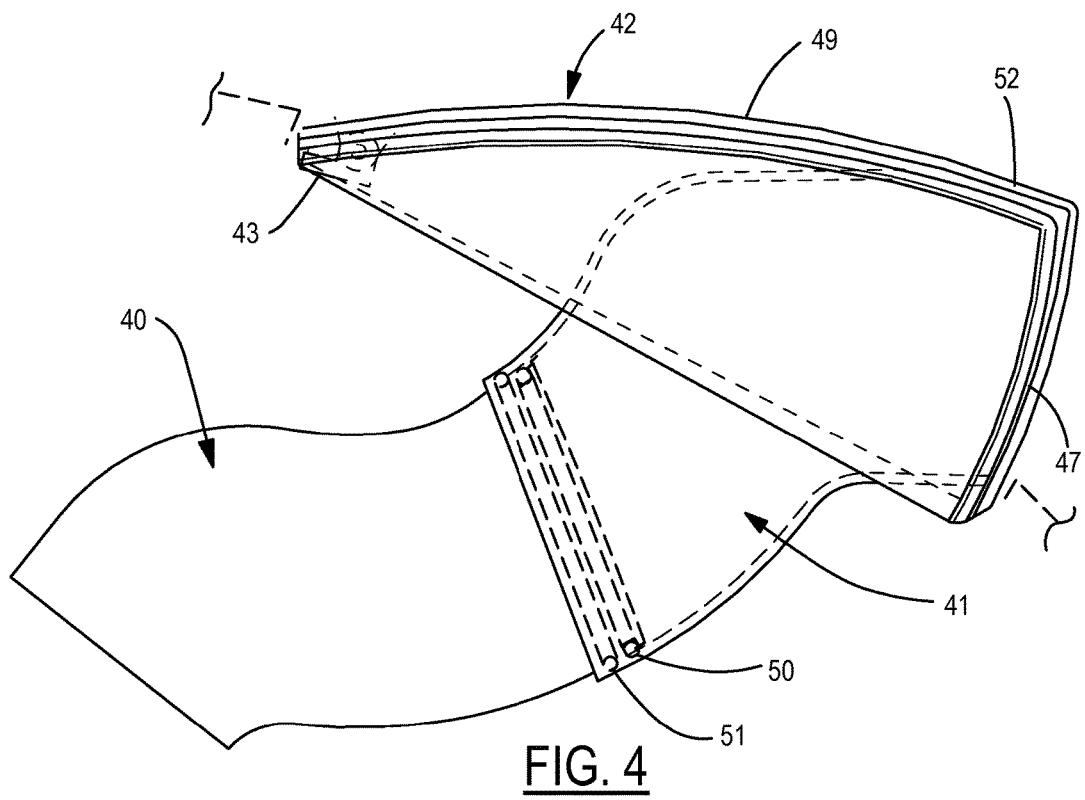
FIG. 4 is a side view of the duct system of FIG. 3 in an extended position.
Figure 5:
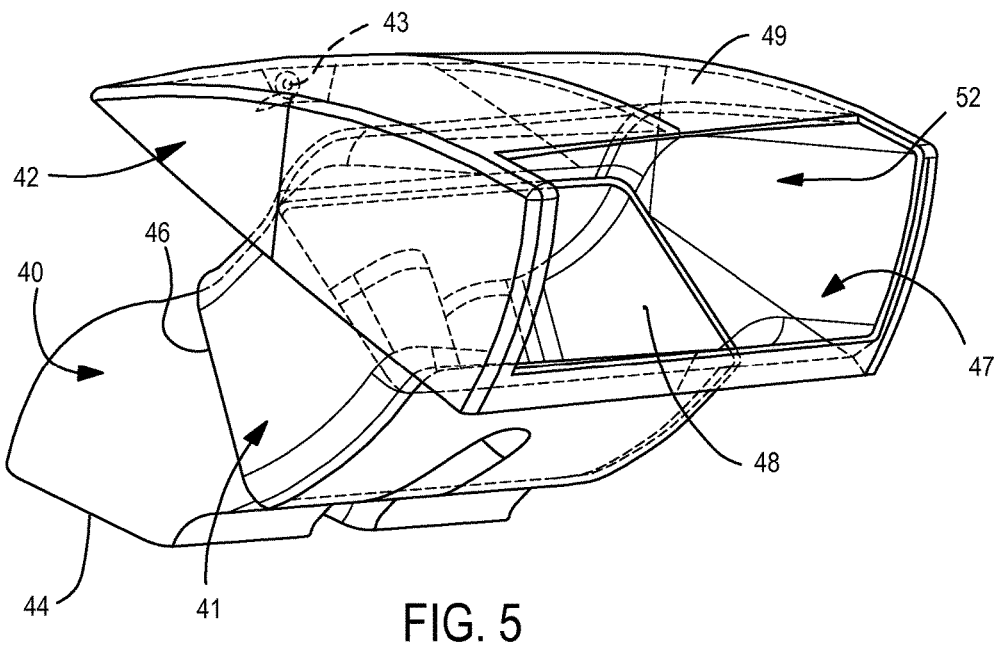
FIG. 5 is a perspective view of the duct system of FIG. 3 in a retracted position.
Figure 6:
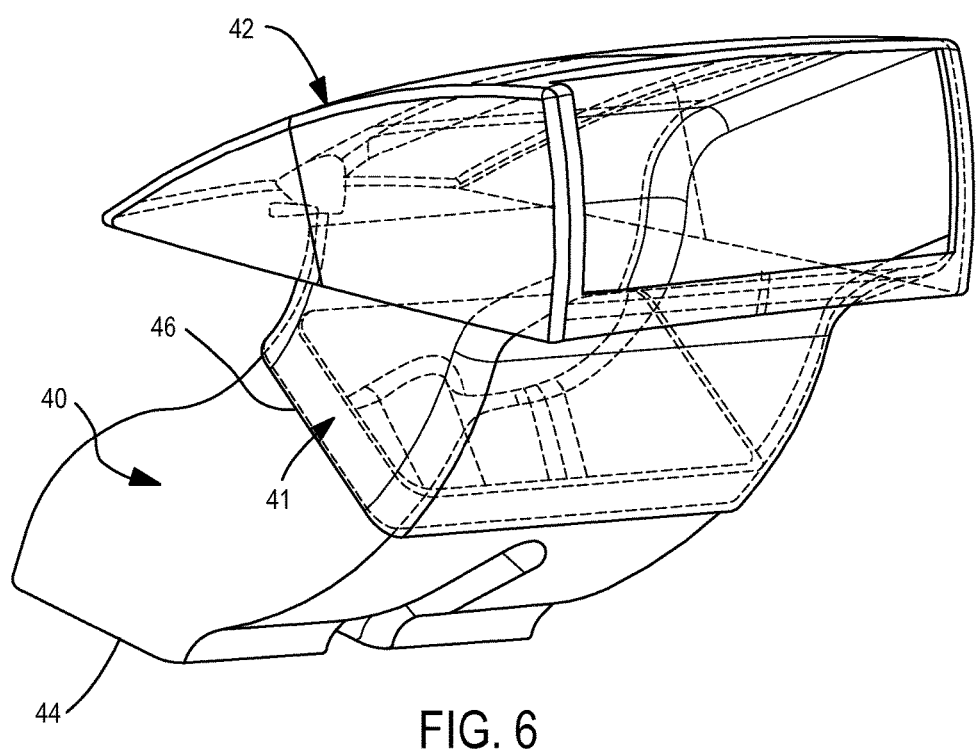
FIG. 6 is a perspective view of the duct system of FIG. 3 in an extended position.
Figure 7:
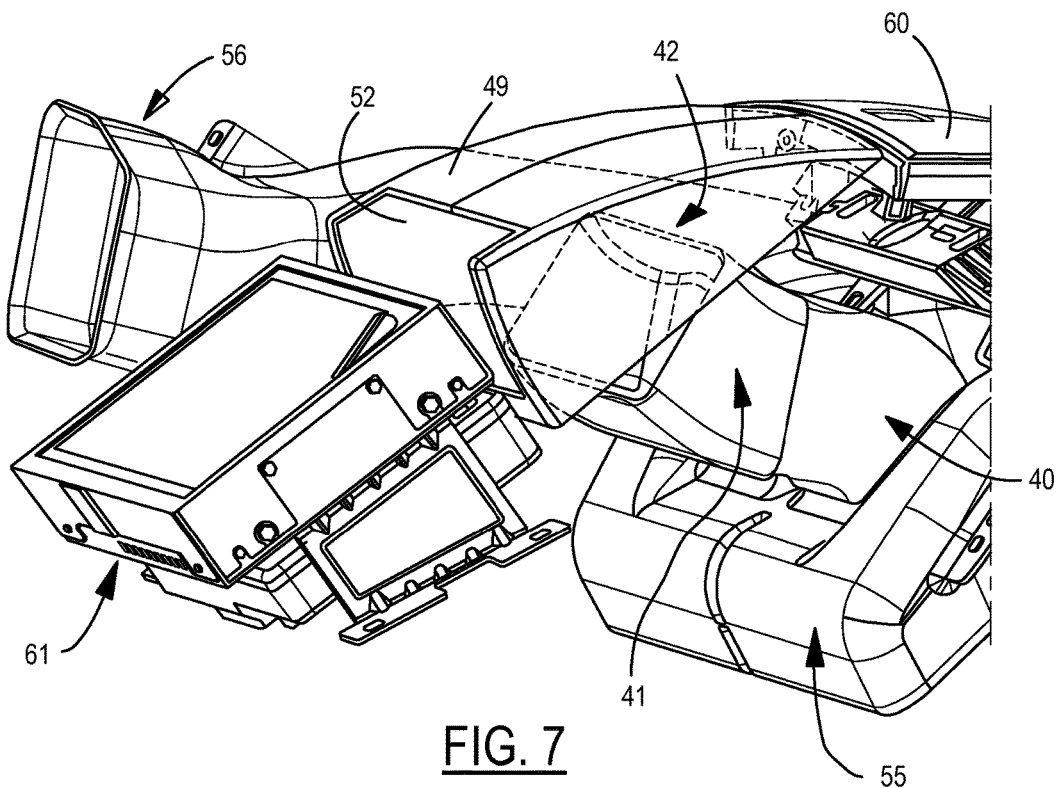
FIGS. 7 and 8 are perspective views of the duct system of FIG. 3 in relation to other instrument panel components and in a retracted and extended position, respectively.

Trim hood 42 has an interior trim surface 49 which is adapted to match an interior trim surface of a vehicle. An open slot 52 may preferably be formed at a remote end of trim hood 42, thereby interrupting trim surface 49 and providing a relatively small amount of fluid communication from telescoping duct 41 to the vehicle interior even when telescoping duct 41 is in its retracted position as shown in FIGS. 3, 5, and 7. Telescoping duct 41 and trim hood 42 are shown in the fully extended position in FIGS. 4, 6, and 8.

Figure 8:
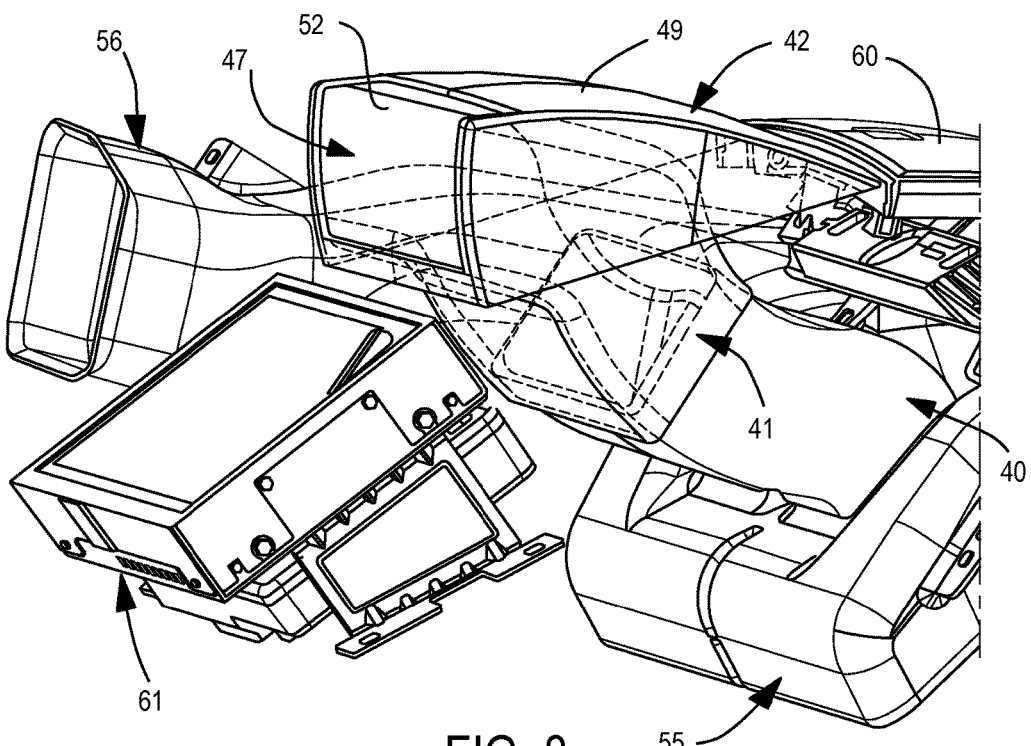

FIGS. 7 and 8 show one embodiment of the vent in association with some other components in a vehicle's instrument panel. Stationary duct 40 is shown extending from a main air handling case 55 of a type known in the art. Additional ducts and vents are fed from case 55 including a duct 56 for a panel register. Trim hood 42 deploy from a location adjacent to other components mounted within the instrument panel such as a multimedia/navigation module 61, for example. Most of the adjacent trim panel surfaces of the instrument panel are not shown in FIGS. 7 and 8 for clarity of illustration. One adjacent trim panel portion 60 is shown along an upper edge of trim hood 42, i.e., along the side having pivot mounting 43. A portion of an associated hinge mechanism for pivoting the trim hood 42 is formed by or attached to panel portion 60. Trim surface 49 of trim hood 42 may preferably be flush with the surrounding instrument panel trim surfaces including the surface of panel portion 60.

Open slot 52 is placed at a location with easy access to permit grasping of trim hood 42 at the edge of slot 52 in order to allow a user to manually pivot trim hood 42 (at least in those embodiments not including a power actuator). Seal elements 50 and 51 may preferably be comprised of 0-ring seals fixedly mounted to stationary duct 40 and telescoping duct 41, respectively. In embodiments without a power actuator, a sliding interface between seal elements 50 and 51 and ducts 40 and 41 may provide a frictional force sufficiently high to hold telescoping duct 40 in a manually selected position and sufficiently low to permit smooth manual movement between selected positions. As a result, the position of trim hood 42 may be infinitely variable when under manual control.

Figure 9:
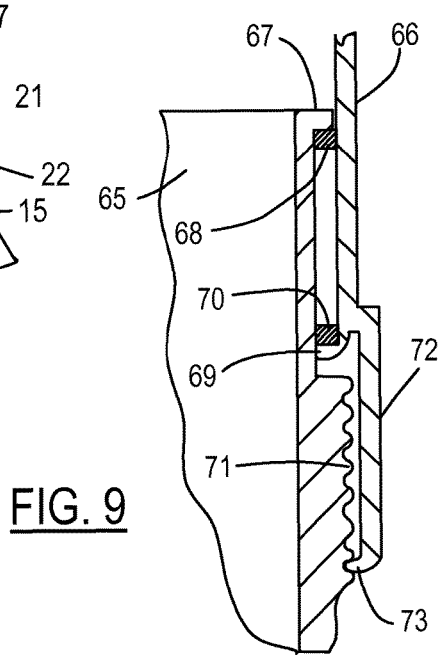
FIG. 9 is a cross section of a sliding interface between a stationary duct and a telescoping duct with a detent mechanism for maintaining various extended positions.

Alternatively, a detent mechanism can be provided for holding the trim hood at a selected position as shown in FIG. 9. A stationary duct 65 slidably receives a telescoping duct 66. Stationary duct 65 has a flange 67 against which a seal element 68 is seated. Telescoping duct 66 includes a flange 69 against which a seal 70 is seated. Stationary duct 65 includes a series of transverse ribs 71 on an outside surface which are arranged to receive a finger 73 at the end of a beam 72 extending from a telescoping duct 66. Beam 72 is sufficiently flexible to permit flexing of finger 73 during longitudinal movement of telescoping duct 66 so that finger 73 is successively captured between different pairs of adjacent ribs 71.

What is claimed is:

1. A ventilation system for a transportation vehicle having a passenger cabin with an interior trim surface, comprising:
   a stationary duct segment receiving an inlet air flow and having a stationary outlet within the passenger cabin hidden behind the interior trim surface;
   a telescoping duct segment having a sliding inlet sealingly coupled to the stationary outlet and sliding on the stationary outlet between a retracted position and an extended position, wherein the telescoping duct segment has a movable outlet arranged to provide a variable flow cross section to the passenger cabin that increases as the telescoping duct segment slides from the retracted position to the extended position;
   a trim hood providing a portion of the interior trim surface and movable with the telescoping duct segment, wherein the trim hood has a pivot axis at an end of the trim hood remote from the movable outlet; and
   wherein conforming curved portions at the stationary outlet and the sliding inlet substantially follow a radius of the pivot axis.

2. The system of claim 1 wherein the trim hood is fixed to the telescoping duct segment.

3. The system of claim 2 wherein the trim hood and telescoping duct segment are integrated in a one-piece construction.

4. The system of claim 1 further comprising:
a power actuator linked to the telescoping duct segment for moving the telescoping duct segment to a selectable position from the retracted position through the extended position.

5. The system of claim 1 comprising at least one seal element between the stationary duct segment and the telescoping duct segment.

6. The system of claim 5 wherein the at least one seal element provides a frictional force to hold the telescoping duct segment in a manually selected position and to permit smooth manual movement between selected positions.

7. The system of claim 1 wherein the interior trim surface includes an open slot in fluid communication with the telescoping duct segment when the telescoping duct segment is in the retracted position.

8. The system of claim 1 wherein the interior trim surface comprises an instrument panel.

9. A vent for an aperture in an automobile instrument panel, comprising:
a stationary duct configured to receive airflow from an air handling case;
a telescoping duct coupled to the stationary duct and configured to receive airflow therefrom; and
a trim hood moving with the telescoping duct having a pivot axis along one side, wherein the trim hood is flush to an interior trim surface of the instrument panel;
wherein the stationary duct and the telescoping duct have conforming curved portions that substantially follow a radius of the pivot axis,
whereby the telescoping duct has a movable outlet arranged to guide the airflow through the aperture toward a passenger cabin seating area, and
wherein a flow cross section of the aperture increases as the telescoping duct slides from a retracted position to an extended position.

10. The vent of claim 9 wherein the trim hood and telescoping duct are integrated in a one-piece construction.

11. The vent of claim 9 further comprising:
a power actuator linked to the telescoping duct for moving the telescoping duct to a selectable position from the retracted position through the extended position.

12. The vent of claim 9 comprising at least one seal element between the stationary duct and the telescoping duct blocking air flow at a sliding interface.

13. The vent of claim 12 wherein the at least one seal element at the sliding interface provides a frictional force to hold the telescoping duct in a manually selected position and to permit smooth manual movement between selected positions.

14. The vent of claim 9 wherein the instrument panel and the trim hood surface define an open slot in fluid communication with the telescoping duct when the telescoping duct is retracted.

\* \* \* \* \*